United States Patent
Yahiaoui et al.

(10) Patent No.: US 10,827,788 B2
(45) Date of Patent: Nov. 10, 2020

(54) ANTI-FOG, ANTI-GLARE FACEMASKS

(71) Applicant: O&M Halyard, Inc., Mechanicsville, VA (US)

(72) Inventors: Ali Yahiaoui, Roswell, GA (US); Anthony Stephen Spencer, Woodstock, GA (US)

(73) Assignee: O&M Haylard, Inc., Mechanicsville, VA (US)

( * ) Notice: Subject to any disclaimer, the term of this patent is extended or adjusted under 35 U.S.C. 154(b) by 525 days.

(21) Appl. No.: 15/524,404

(22) PCT Filed: Nov. 13, 2014

(86) PCT No.: PCT/US2014/065410
§ 371 (c)(1),
(2) Date: May 4, 2017

(87) PCT Pub. No.: WO2016/076869
PCT Pub. Date: May 19, 2016

(65) Prior Publication Data
US 2017/0318877 A1 Nov. 9, 2017

(51) Int. Cl.
| | | |
|---|---|---|
| G02B 26/00 | (2006.01) |
| G02B 26/02 | (2006.01) |
| A41D 13/11 | (2006.01) |
| C09D 1/00 | (2006.01) |
| G02B 27/00 | (2006.01) |
| G02B 1/18 | (2015.01) |
| C09D 101/02 | (2006.01) |
| G02B 1/11 | (2015.01) |

(52) U.S. Cl.
CPC .......... *A41D 13/1184* (2013.01); *A41D 13/11* (2013.01); *C09D 1/00* (2013.01); *C09D 101/02* (2013.01); *G02B 1/11* (2013.01); *G02B 1/18* (2015.01); *G02B 27/0006* (2013.01)

(58) Field of Classification Search
CPC . G02B 1/18; G02B 1/105; G02B 1/11; G02B 1/111; G02B 27/0006
USPC .......................... 359/290–292, 295, 296, 298
See application file for complete search history.

(56) References Cited

U.S. PATENT DOCUMENTS

| | | |
|---|---|---|
| 3,888,246 A | 6/1975 | Lauer |
| 3,890,966 A | 6/1975 | Aspelin et al. |
| 4,419,993 A | 12/1983 | Petersen |
| 4,635,628 A | 1/1987 | Hubbard et al. |
| 5,585,186 A | 12/1996 | Scholz et al. |
| 5,723,175 A | 3/1998 | Scholz et al. |

(Continued)

FOREIGN PATENT DOCUMENTS

WO    WO 2013/127054 A1    9/2013

OTHER PUBLICATIONS

International Search Report for PCT/US2014/065410, dated Jul. 14, 2015, 7 pages.

*Primary Examiner* — Brandi N Thomas
(74) *Attorney, Agent, or Firm* — DOority & Manning, P.A.

(57) ABSTRACT

A coating composition that is incorporated into a facemask to reduce fogging and glare is provided. For example, in one embodiment, the facemask contains a shield or visor formed from a transparent substrate having at least one surface applied with the coating composition of the present disclosure. The coating composition contains a large amount of nanoparticles, desirably greater than 10 wt %.

10 Claims, 1 Drawing Sheet

(56) References Cited

U.S. PATENT DOCUMENTS

| | | |
|---|---|---|
| 5,753,373 A | 5/1998 | Scholz et al. |
| 5,804,612 A | 9/1998 | Song et al. |
| 5,813,398 A | 9/1998 | Baird et al. |
| 5,873,931 A | 2/1999 | Scholz et al. |
| 5,997,621 A | 12/1999 | Scholz et al. |
| 6,040,053 A | 3/2000 | Scholz et al. |
| 6,217,176 B1 | 4/2001 | Maekawa |
| 6,455,142 B1 | 9/2002 | Heberger et al. |
| 6,945,656 B2 | 9/2005 | Takahashi et al. |
| 7,703,456 B2 * | 4/2010 | Yahiaoui ............ A41D 13/1184 128/206.19 |
| 2007/0142595 A1 * | 6/2007 | Hashiba ................ C08F 212/08 526/348 |
| 2013/0065039 A1 * | 3/2013 | Tada et al. ............... C08K 3/04 428/220 |

* cited by examiner

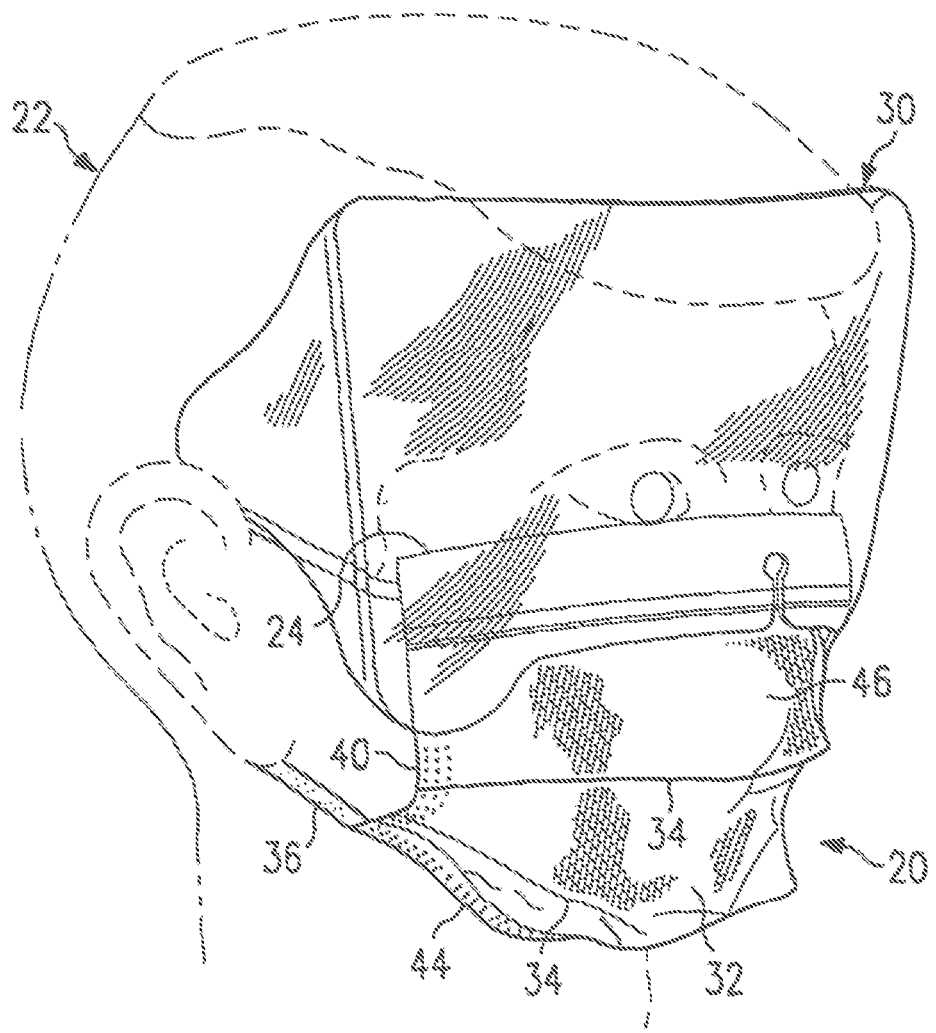

ANTI-FOG, ANTI-GLARE FACEMASKS

RELATED APPLICATIONS

This application is a national phase of and claims priority to PCT/US2014/065410, filed Nov. 13, 2014, the contents of which are incorporated herein by reference.

BACKGROUND

The use of protective facemasks has become standard for many health care and other related activities. The primary objective of the facemasks is to filter harmful materials from the inhaled and exhaled air. However, medical facemasks may also be used to protect the wearer from liquid insults. As such, these masks may include an attached clear plastic visor to protect the eyes from liquid splashes. Alternatively, a stand-alone clear face shield may also be worn in conjunction with the filtering mask.

One continuing problem attendant with the use of face shields or protective facemasks with attached visors in both medical and industrial applications is fogging of the visor or shield. The warm, moist air exhaled by the wearer will condense on relatively cool surfaces that are in close proximity to the nose or mouth of the user. Condensate droplets will fog or cloud eye glasses, face masks and other protective shields, along with oculars for scientific equipment, such as endoscopes and microscopes. This fogging or clouding results when a high concentration of moisture vapor contained within the protective mask passes through or around the facemask and condenses on a cooler eyeglass in the proximity of the mask. Various techniques have been proposed to solve the problem of fogging, such as described in U.S. Pat. Nos. 4,635,628; 4,419,993; 3,890,966; and 3,888,246.

Nevertheless, many of these solutions fail to solve the problem of glare. Glare is an undesirable specular reflection of light from a surface upon which the light is incident. For instance, personnel working in clean rooms and medical personnel performing lengthy, complex surgical procedures often report eye strain and eye fatigue from such reflections and glare after wearing a facemask for extended periods of time. Eye fatigue from glare is particularly noticeable when using precision scientific equipment, such as microscopes and endoscopes, while wearing a facemask or other protective equipment to protect and/or shield the wearer's face. Many commercial transparent films (e.g., polyester) used to form transparent visors or shields are coated with a thin finish; however, the impact of the finish on optical properties is negligible.

Various techniques have thus been suggested to reduce both fogging and glare in facemasks. For example, U.S. Pat. No. 5,813,398 to Baird, et al. describes a facemask having a filter body with a layer of fluid impervious film disposed over an upper portion of the facemask to block air exhaled by the wearer through the filter body from fogging eyeglasses and/or an eye piece. A layer of non-woven material is preferably placed over the fluid impervious film layer to substantially reduce and/or eliminate any glare from the fluid impervious film layer. In addition, U.S. Pat. No. 5,585,186 to Scholz, et al.; U.S. Pat. No. 5,723,175 to Scholz, et al.; U.S. Pat. No. 5,753,373 to Scholz. et al.; U.S. Pat. No. 5,873,931 to Scholz, et al.; U.S. Pat. No. 5,997,621 to Scholz, et al.; and U.S. Pat. No. 6,040,053 to Scholz, et al. generally describe coating compositions that rely on a solid particles of porous inorganic metal oxide network to impart anti-reflection properties, and very specific surfactants to impart anti-fogging properties. Unfortunately, such techniques for reducing fogging and glare in facemasks still have limitations. For example, the use of one coating ingredient for anti-reflection (e.g., porous inorganic metal oxides) and another for anti-fogging (e.g., surfactants) is overly complex and expensive. Other issues with surfactant/solid particle dispersions relate to formulation instability over time, which can negatively affect optical properties of the product. U.S. Pat. No. 7,703,456 to Yahiaoui et al. generally describes a coating composition for a facemask that is about 50 to 250 nanometers thick and that consists essentially of particular organic polymers with a water soluble cellulosic ether derivative making up at least 90% of the organic polymer. U.S. Pat. No. 7,703,456 teaches that nanoparticles may be present in the composition at a concentration of less than 10 wt %.

Currently, there is a need for an improved technique for simultaneously eliminating the deleterious effects of fogging and reducing glare on facemasks.

SUMMARY

In accordance with one embodiment of the present disclosure, a facemask is disclosed that comprises a substrate, such as a transparent polyester visor or shield. A coating is present on at least one surface of the substrate that consists essentially of greater than 10 wt % nanoparticles.

Other features and aspects of the present disclosure are discussed in greater detail below.

BRIEF DESCRIPTION OF THE DRAWINGS

FIG. 1 is a schematic illustration of a facemask that may be formed in accordance with one embodiment of the present disclosure.

DETAILED DESCRIPTION

Reference now will be made in detail to various embodiments of the disclosure, one or more examples of which are set forth below. Each example is provided by way of explanation of the disclosure, not limitation. In fact, it will be apparent to those skilled in the art that various modifications and variations may be made in the present disclosure without departing from the scope or spirit of the disclosure. For instance, features illustrated or described as part of one embodiment, may be used on another embodiment to yield a still further embodiment. Thus, it is intended that the present disclosure covers such modifications and variations as come within the scope of the appended claims and their equivalents.

In general, the present disclosure is directed to a facemask that contains the dried residue of an aqueously applied coating composition for reducing fogging and glare. For example, in one embodiment, the facemask contains a shield or visor 30 that is utilized in conjunction with a filter body. Alternatively, the facemask may be a stand-alone shield or visor 30. Regardless, the shield or visor may be formed from a transparent substrate, desirably polyester, having at least one surface applied with the coating composition of the present disclosure.

The transparent substrate to which the coating composition of the present disclosure is applied may be formed from a variety of different materials. Examples of such materials include, but are not limited to, polyesters, such as polyethylene terephthalate or polybutylene terephthalate; polycarbonates; allyldiglycolcarbonates; polyacrylates, such as polymethylmethacrylate; polystyrenes; polysulfones; polyethersulfone; cellulose acetate butyrate; glass; combinations thereof; and so forth. In one particular embodiment, the transparent substrate is formed from polyester (PET). The transparent substrate may be in the form of a film, sheet, panel or pane of material, and may be formed by any well-known process, such as blowing, casting, extrusion, injection molding, and so forth. It is desirable that, prior to applying the aqueous coating composition or formulation, the PET film is first oxidized via corona or plasma glow discharge at a watt density of 2 to 10 watt/(($ft^2$/min)/side). The glow discharge enables PET to be more receptive to subsequent coating with the aqueous formulation and also allows for good uniformity throughout the PET film.

Typical PET film reflects back incident light by about 8-11% and is sufficient to cause eye strain/fatigue. To minimize glare, two conditions must simultaneously be met:

Refractive Index: must follow a root square relationship with respect to the refractive index of PET film—Formulations containing particles, surfactant and a binder have been developed that meet this requirement.

Coating thickness: A thickness of about 140 nm or ¼ the wavelength of the green color centered at 550 nm is desired to eliminate the green color from reflected light via destructive interference, yielding a light purple hue on the PET visor. The human eye is most sensitive to the green color and eliminating the green from the reflected visible light will cause less eye fatigue/strain and thus should be preferred by physicians and hospital workers. However, the coating thickness can be lower than 140 nm if a specific hue is preferred. For example, a thickness between 85 and 110 nm will yield a more pronounced darker blue/darker hue. The more desired thickness is in the 90 to 105 nm range.

PET is relatively hydrophobic and water droplets suspended in air during exhalation will bead up on PET and will therefore scatter visible light causing the PET film to fog up and hinder vision. Providing anti-fog properties requires a hydrophilic coating that can prevent water droplets from beading up, desirably resulting in a droplet contact angle of less than 20 degrees on the PET. Fogging was evaluated by directly breathing onto the film held approximately one inch (2.5 cm) from the mouth. Fogging was determined subjectively to be excellent if no fogging was observed. All examples (except the control) had excellent (instant) fog dissipation. The control sample fogged persistently.

The coating composition of the present disclosure includes one or more water-soluble organic polymers. The water-soluble organic polymer may be utilized as the principal component of the coating composition to simultaneously reduce both fogging and glare. To minimize glare, the water-soluble organic polymer may be selected to have a nominal refractive index approximately equal to the square root of the refractive index of the transparent substrate. In some embodiments of this disclosure, the water-soluble organic polymer of the coating may have an average index of refraction of 1.0 to 1.7, in some embodiments from 1.2 to 1.5.

Any of a variety of water-soluble organic polymers capable of achieving the desired characteristics of transparency, reduced fogging, and reduced glare may be utilized in the present disclosure. One exemplary water-soluble organic polymer is Bermocoll E 230FQ, which is ethyl hydroxyethyl cellulose commercially available from Akzo Nobel of Stamford, Conn. It is desirable that the cellulose be present in the aqueous composition in an amount of between 0.1 and 0.5 weight percent (wt %), more desirably about 0.2 wt %.

Also present in the composition is a nanoparticle, desirably Nalco 2326 particles, which are colloidal silica particles commercially available from Nalco Co. of Naperville, Ill. The nanoparticles should be present in an amount between 5 and 20 wt %, more desirably about 15 wt %. Nalco 2326 is available as a silica sol with mean particle size of 5 nanometers, pH 10.5, and solid content 15% by weight.

Another ingredient of the composition is a surfactant that decreases surface tension of water at low concentrations thus allowing a more uniform coating of actives on the PET film. One example of such a low molecular weight silicone glycol surfactant is Masil® SF-19, available from Emerald Performance Materials of Cheyenne, Wyo. The surfactant is desirably present in the composition at a concentration of between about 0.05 and 0.15 wt %, more desirably about 0.1 wt %. Another example is Surfactant 10G, 50%, a glycidol ether, and is available from Arch Chemicals, Inc., Norwalk, Conn. Other surfactants that may be used may be an alkyl polyglycoside such as Standapol 215UP made by BASF, or Stantex® H 215UP from Pulcra Chemical and Lutensol® A65N, also from BASF. A small amount of alcohol (e.g. Isopropyl alcohol or methanol available from Sigma Aldrich) can also be used to help wet out the PET film.

The coating composition is formed as an aqueous solution. This solution may contain, for instance, at least about 75 wt % water, preferably de-ionized (DI) water, in some embodiments at least about 90 wt % water, and in some embodiments, at least about 96 wt % water.

The aqueous solution may be applied to the transparent substrate using any conventional technique, such as bar, roll, knife, curtain, print (e.g., rotogravure), spray, slot-die, or dip-coating techniques. When applying the coating composition to multiple surfaces, each surface may be coated sequentially or simultaneously.

As discussed above, the PET film may be oxidized prior to coating using corona discharge, ozone, plasma, or flame treatment methods. This helps to ensure uniform coating and wetting of the transparent substrate. In some embodiments, the transparent substrate may also be applied with a pre-treatment to facilitate uniform application of the coating composition thereto. For instance, in one embodiment, a primer is applied to the transparent substrate, such as polyvinylidene chloride (PVDC) or polyvinyl chloride (PVC). Typically, the primer does not have a substantial effect on the optical properties of the transparent substrate.

The average thickness of the resulting coating may be selected to minimize glare. Specifically, it is known that a single-layer optical coating having a thickness equal to ¼ the wavelength of incident light will result in reflections from the air-coating boundary and coating-substrate boundary that are 180 degrees out of phase with each other, thereby causing destructive interference and reducing total reflectance. Thus, because the wavelength of visible incident light ranges from approximately 200 to 1000 nanometers, the average thickness of the coating of the present disclosure typically ranges from about 50 to 250 nanometers. In addition, because 550 nanometers is the center of the wavelength range at which the human eye displays a peak photo-optic response, the coating thickness is desirably between about 90 and about 140 nanometers. It should be understood, however, that the coating of the present disclosure is not limited to a single layer, but may also contain multiple layers. For example, it is readily understood by those skilled in the art that two layers may be utilized, with each layer being optimized in refractive index and thickness to minimize reflection of different wavelengths of light, thus further enhancing the anti-glare properties over a wider spectrum of light. In addition, while the average coating thickness is desirably uniform, the actual coating thickness may vary considerably from one particular point on the coating to another. Such variations in thickness, when correlated over a visibly distinct region, may actually be beneficial by contributing to the broadband anti-reflective properties of the coating.

The coating composition of the present disclosure may be applied to one or both surfaces of the transparent of the substrate. When used in a facemask, the coating is generally present on at least the surface of the transparent substrate that faces the wearer. In addition, the coating may cover an entire surface of the transparent substrate, or may only cover a portion of the surface, such as a portion immediately adjacent to the eyes in a face shield. The coated substrate may be dried to remove water from the coating. For example, the coated substrate may be dried in an oven at a temperature of from about 20 degree C. to about 150 degrees C., in some embodiments from about 50 degrees C. to about 120 degrees C., and in some embodiments, from about 100 degrees C. to about 110 degrees C. Once dried, the water-soluble organic polymers may constitute at least about 50 wt %, in some embodiments at least about 75 wt %, and in some embodiments, at least about 90 wt % of the coating.

As stated, the coating composition reduces fogging and glare when applied to a transparent substrate in the manner set forth. The anti-fogging property is exhibited by the tendency of the coating to resist the formation of water droplets that would otherwise significantly reduce transparency. Water vapor from, for example, human breathing, tends to condense on the coated substrate in the form of a thin uniform water film, rather than as water droplets. Such a uniform film does not significantly reduce the clarity or transparency of the substrate. Likewise, the reduction in glare is discernible through the light transmission and haze of the coated substrate. Light transmission through a coated substrate depends on the angle of incidence and the wavelength of light, and is determined using ASTM D1003 entitled "Haze and Luminous Transmittance of Transparent Plastics". An increase in light transmission reveals a corresponding reduction in glare. In most embodiments of the present disclosure, the coated substrate exhibits an increase in transmission of normal incident light of greater than about 10% when compared to an uncoated substrate, at a wavelength of 550 nanometers.

In addition, haze is a measurement of the wide angle scattering of light within a material. Haze may be measured with a BYK Gardner "Haze Gard Plus" instrument (BYK-Gardner USA, Columbia, Md.) using ASTM D 1003-61, procedure A, entitled "Haze and Luminous Transmittance of Transparent Plastics", which is incorporated herein by reference in its entirety for all purposes. Haze is defined as the percentage of transmitted light, which in passing through the specimen, deviates from the incident beam by more than an average of 25 degrees. Haze is commonly referred to as the "milkiness" of a specimen, or its loss in contrast. A negative value for the difference in haze, expressed as the difference in the percentage of haze for the coated substrate and an uncoated substrate, signifies a reduction in haze. In most embodiments of the present disclosure, the difference in haze is less than 0%, in some embodiments from about −1% to about −0.001%, and in some embodiments, from about −0.5% to about −0.01%.

As stated, the coated transparent substrate of the present disclosure is particularly useful in facemasks. One embodiment of such a facemask 20 is shown that includes a visor 30 attached to a filter body 32. The filter body 32 has a top edge 24 and a bottom edge 44, an exterior surface 46, and may have multiple pleats 34. The visor 30 is designed to protect the eyes and other portions of the face of a wearer 22 from liquid spray or splash. A pair of ear loops 36 (only one of which is shown in FIG. 1) is also attached to respective opposite side edges 40 of the filter body 32 for use in securing the facemask 20 over the nose and mouth of the wearer 22. If desired, surgical ties or headbands may also replace the ear loops 36.

In one embodiment, the visor 30 is formed from a transparent substrate, such as described above, and is dimensioned to fit across the width of the filter body 32 and extend over the eyes of the wearer 22. The thickness of the visor 30 may vary so that it is stiff enough to prevent collapse, yet flexible enough to bend. In some embodiments, the thickness of the visor 30 is from about 0.001 to about 1 millimeter, in some embodiments from about 0.01 to about 0.5 millimeters, and in some embodiments, from about 0.1 to about 0.2 millimeters.

The present disclosure may be better understood with reference to the following examples.

Test Methods: The following test methods are utilized in the Examples.

Coating Thickness: The coating thickness was measured with using spectroscopic ellipsometry or reflectometry analytical techniques. For Ellipsometry we utilized a RC2 DI model to measures the coating thickness and refractive index. Additionally, we also utilized a F2-RT instrument from Filmetrics. The F2-RT also measures coating thickness and refractive index, but can also measure other critical optical properties such a spectral transmittance, spectral reflectance and reflectance color.

Haze: Haze is a measurement of the wide angle scattering of light within a material. Haze was measured with a BYK Gardner "Haze Gard Plus" instrument (BYK-Gardner USA, Columbia, Md.) using ASTM D 1003-61, procedure A, entitled "Haze and Luminous Transmittance of Transparent Plastics."

Table 1, Examples

The ability to inhibit haze yet allow light transmittance with a coating composition of the present disclosure was demonstrated. Coating compositions were formed from water-soluble organic polymer Bermocoll E 230FQ, which is ethyl hydroxyethyl cellulose commercially available from Akzo Nobel of Stamford, Conn. Nalco 2326 colloidal silica particles were also used as well as various surfactants as shown in Table 1. The balance was de-ionized water. The coating was applied to both sides of the film using a rotogravure process.

The active percentage of the ingredients within each coating composition is set forth below in Table 1. Example 1 was a control without any coating.

TABLE 1

Coating composition and optical properties of coated PET film

| Example | Composition (wt %) | | | | | | Performance | |
|---|---|---|---|---|---|---|---|---|
| | H₂O | Standapol 215UP | Lutensol A65 N | Stantex H 215 UP | Nalco 2326 | Bermocoll E230 FQ | % Light Transmission | % Haze |
| 1 (Control PET Film) | 0.00 | 0.00 | 0.00 | 0.00 | 0.00 | 0.00 | 90.00 | 0.50 |
| 2 | 85.24 | 0.85 | 0.00 | 0.00 | 24.85 | 0.06 | 97.50 | 0.43 |
| 3 | 85.24 | 0.85 | 0.00 | 0.00 | 23.85 | 0.06 | 97.40 | 0.51 |
| 4 | 84.69 | 0.00 | 0.10 | 0.00 | 15.01 | 0.20 | 98.50 | 0.50 |
| 5 | 85.39 | 0.00 | 0.00 | 0.64 | 13.88 | 0.10 | 96.80 | 0.50 |

Note:
Both sides of PET film were coated.

As can be seen in Table 1, the compositions had very high amounts of nanoparticles and yet also had very high light transmittance values. The haze of each example (except barely by example 2) resulted in a delta haze (haze of coated substrate minus haze of the untreated control) that was less than zero.

Table 2, Examples

Table 2 has additional examples at differing nanoparticle concentrations and using different surfactants as indicated in the Table. The balance was de-ionized water. The coating was applied to both sides of the film using a slot coating process to determine if the application process affected the light transmittance and haze.

TABLE 2

Coating Composition and Optical properties of coated PET Film

| Example | Composition (Wt %) | | | | | | Coating Thickness (nm) | % LT[1] | | % Haze[1] | |
|---|---|---|---|---|---|---|---|---|---|---|---|
| | Bermocol E230 FQ | Surfactant 10G | MASIL SF-19 | Nalco 2326 | Isopropyl alcohol | DI Water | | AVG | STD | AVG | STD |
| 1 | 0.04% | 0.1% | 0.0% | 7.1% | 0 | 92.7% | 103 | 99.17 | 0.12 | 0.44 | 0.01 |
| 2 | 0.04% | 0.1% | 0.0% | 7.1% | 0 | 92.7% | 103 | 99.57 | 0.06 | 0.21 | 0.01 |
| 3 | 0.04% | 0.1% | 0.0% | 7.1% | 0 | 92.7% | 98 | 99.63 | 0.06 | 0.22 | 0.02 |
| 4 | 0.04% | 0.1% | 0.0% | 7.1% | 0 | 92.7% | 98 | 99.70 | 0.00 | 0.23 | 0.02 |
| 5 | 0.04% | 0.1% | 0.0% | 7.1% | 0 | 92.7% | 98 | 98.77 | 0.06 | 0.46 | 0.01 |
| 6 | 0.04% | 0.1% | 0.0% | 7.1% | 0 | 92.7% | 103 | 98.77 | 0.06 | 0.49 | 0.02 |
| 7 | 0.04% | 0.1% | 0.0% | 7.1% | 0 | 92.7% | 103 | 98.53 | 0.06 | 0.51 | 0.03 |
| 8 | 0.04% | 0.1% | 0.0% | 7.1% | 0 | 92.7% | 103 | 98.53 | 0.06 | 0.60 | 0.01 |
| 9 | 0.04% | 0.1% | 0.0% | 7.1% | 0 | 92.7% | 103 | 98.67 | 0.06 | 0.53 | 0.01 |
| 10 | 0.04% | 0.1% | 0.0% | 7.1% | 0 | 92.7% | 103 | 98.80 | 0.10 | 0.55 | 0.00 |
| 11 | 0.04% | 0.1% | 0.0% | 7.1% | 0 | 92.7% | 103 | 98.90 | 0.10 | 0.54 | 0.01 |
| 12 | 0.044% | 0.10% | 0.0% | 7.11% | 0 | 92.7% | 103 | 98.80 | 0.00 | 0.57 | 0.01 |
| 13 | 0.3% | 0.0% | 0.4% | 23.2% | 3.1% | 73.0% | 320 | 97.18 | 0.08 | 0.80 | 0.03 |
| 14 | 0.3% | 0.0% | 0.4% | 23.2% | 3.1% | 73.0% | 100 | 99.30 | 0.10 | 0.90 | 0.06 |

[1]Optical properties measured via HazeGard Plus ® ASTM D1003-61

As can be seen in Table 2, the compositions had very high amounts of nanoparticles and yet also had very high light transmittance values. The haze of most examples resulted in a delta haze (haze of control minus haze of the example) that was less than zero.

The coating compositions of the Examples were applied to a clear polyester film obtained from E. I. duPont of Wilmington, Del. under the name "Melinex® 516". To apply the coating, the ingredients of each composition were initially dispersed in deionized water. The resulting dispersion was thoroughly mixed at a temperature of less than 45 degrees C. (or ambient temperature). The mixing was performed until a clear solution was obtained. Coating of the polyester film was performed by either the rotogravure process or by slot coating, as indicated. Conditions for both rotogravure and slot die processes along with bath concentration and line speed can be tailored to deliver the desired coating thickness. A coating thickness was targeted so that the dried coated film yielded a blue/purple hue. Drying was carried out in a hot air convection oven at about 110 degrees C. for typically about 1 minute or until constant weight. The coating solution is degassed to remove air bubbles in order to eliminate potential defects on the coated film. Coatings were applied sequentially, i.e., one side at a time, but a 1-step simultaneous dual side coating is also possible As indicated above, the coating composition of the present disclosure achieved improved light transmittance and reduced haze when applied to clear polyester film for use as a visor 30, in comparison to those taught in U.S. Pat. No. 7,703,456, which taught compositions with particles in an amount below 10 wt %.

While the disclosure has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present disclosure should be assessed as that of the appended claims and any equivalents thereto.

What is claimed is:

1. A facemask comprising a transparent substrate, wherein a dried residue of an aqueously applied coating is present on at least one surface of said substrate, the coating having a thickness of from about 50 to about 250 nanometers and consisting essentially of organic polymers, nanoparticles and a surfactant, wherein the nanoparticles are present in an amount greater than 15 wt %, and the substrate forms a visor or shield of the facemask that exhibits a transmission of normal incident light of greater than about 3% when compared to an uncoated substrate.

2. A facemask as defined in claim 1, wherein said substrate is a polyester film.

3. A facemask as defined in claim 1, wherein said coating comprises at least one organic polymer having an index of refraction of from 1.0 to 1.7.

4. A facemask as defined in claim 1, wherein said organic polymer is ethyl hydroxyethyl cellulose.

5. A facemask as defined in claim 1, wherein said coating comprises less than about 10 wt % of surfactants.

6. A facemask as defined in claim 1, wherein said coating comprises less than about 1 wt % of surfactants.

7. A facemask as defined in claim 1, wherein said coating further comprises antiblocking particles.

8. A facemask as defined in claim 1, wherein said coated substrate exhibits a transmission of normal incident light of greater than about 5% when compared to an uncoated substrate.

9. A facemask as defined in claim 1, wherein said coated substrate exhibits a transmission of normal incident light of greater than about 10% when compared to an uncoated substrate.

10. A facemask as defined in claim 1, wherein the haze of said coated substrate subtracted by the haze of an uncoated substrate is less than 0%.

* * * * *